Dec. 21, 1965   J. S. JARVIS   3,224,560
COMBINE HARVESTERS
Filed Oct. 23, 1963   2 Sheets-Sheet 1
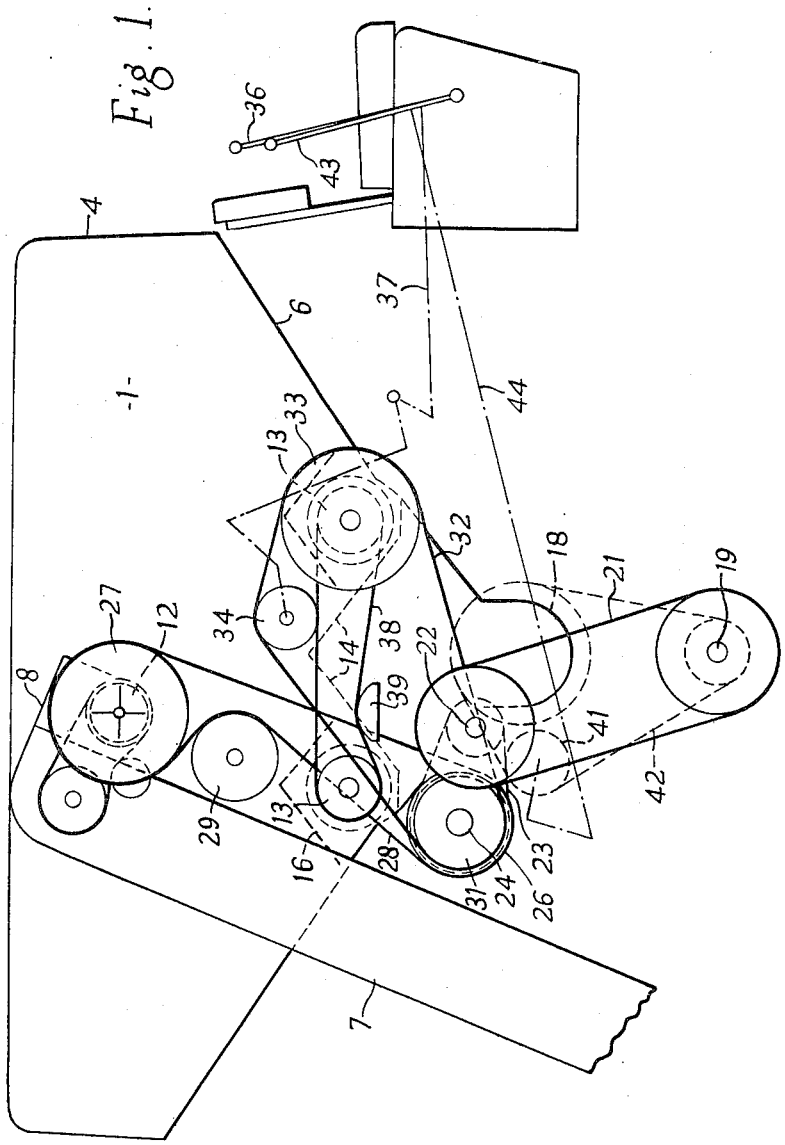
INVENTOR
John Stevens Jarvis
BY
ATTORNEY

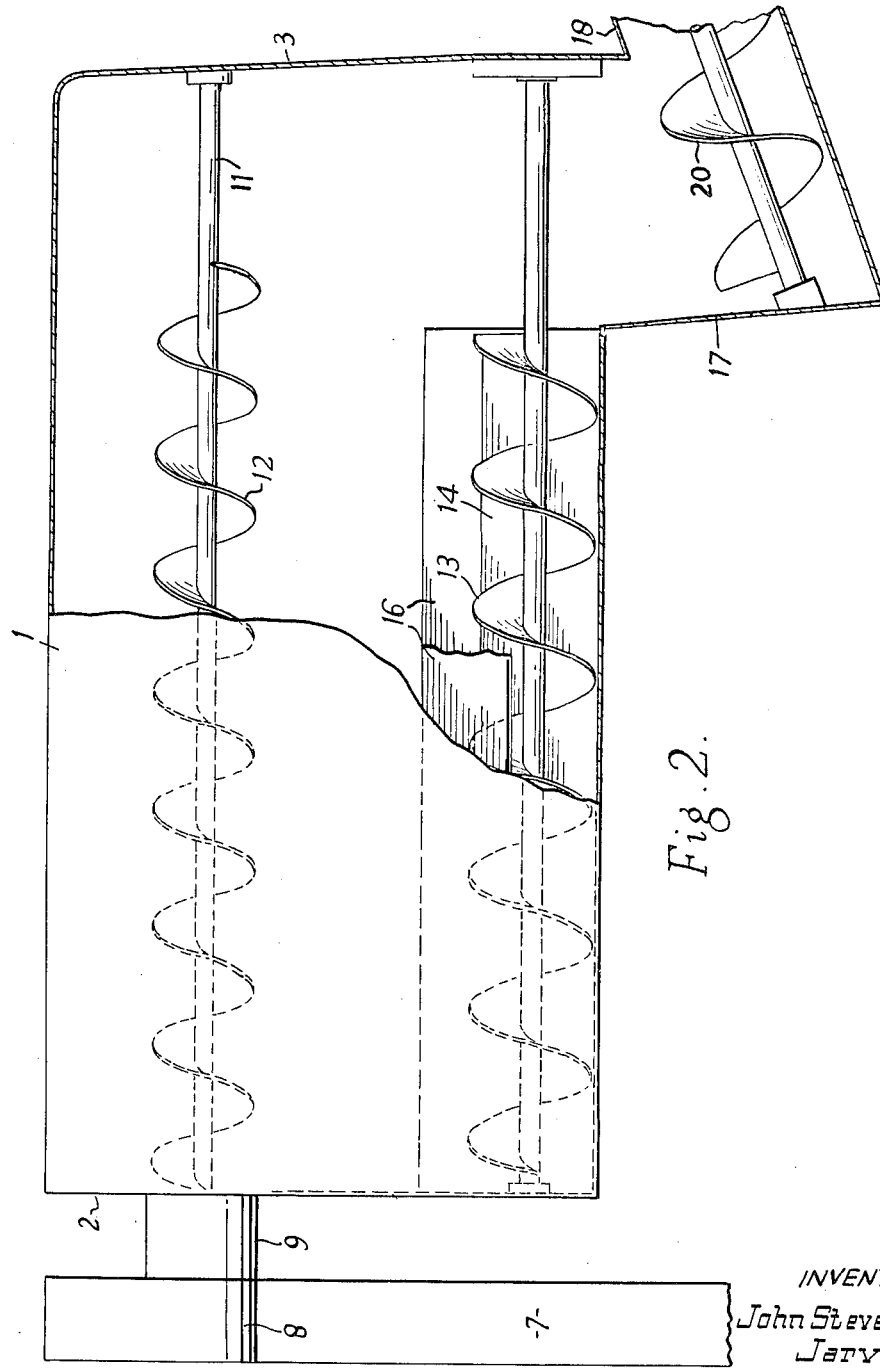

though the present invention has been described in reference to specific details of certain embodiments thereof, it is not intended that such details be regarded as limitations upon the scope of the invention except insofar as included in the accompanying claims.

United States Patent Office 3,224,560
Patented Dec. 21, 1965

3,224,560
COMBINE HARVESTERS
John S. Jarvis, Ipswich, Suffolk, England, assignor to Ransomes Sims & Jefferies Limited, Ipswich, England
Filed Oct. 23, 1963, Ser. No. 318,398
4 Claims. (Cl. 198—64)

This invention relates to grain storage and supply means for combine harvesters.

Grain threshed by combine harvesters may be fed straight into sacks or alternatively it may be fed into a suitable hopper or grain tank provided on the harvester and stored therein temporarily. In the latter case threshing proceeds until the grain tank is filled and grain is then discharged from the tank into a lorry for conveyance to a barn or storage shed.

Combine harvesters which include a grain tank are usually provided with a filling auger, which receives grain from the threshing mechanism, and a discharge auger, which is used for emptying the contents of the tank into a lorry or trailer. The discharge auger is preferably made in two sections one section of which is within the body of the tank and lies parallel to and close to its bottom wall, whilst the other section is within an outlet spout which extends upwardly from an outlet aperture at the bottom of the tank, close to the discharge end of the first section of the auger, to a height sufficient for the spout to pass above a lorry.

In order to provide a flow of grain to the first section of the auger a pair of opposite side walls of the tank have their lower portions inclined to the vertical so as to provide surfaces which slope inwardly and downwardly towards the auger. The greater the moisture content of the grain the steeper must be these sloping surfaces, and the capacity of the tank is thus reduced. On the other hand, the tank must be large enough to enable the machine to work for sufficient time for lorries and trailers to travel from the field to the storage sheds and back again, sufficient capacity is therefore obtained by increasing the height of the tank. This raises the centre of gravity of the machine, which is a disadvantage when working on sloping ground.

According to the present invention grain storage and supply means for a combine harvester comprises a grain tank for receiving and storing grain threshed by the harvester, grain discharge means for conveying grain in the tank towards an outlet aperture thereof and including two augers extending longitudinally of the tank near the bottom thereof, and guide surfaces serving to direct flow of grain to the augers, whereby upon rotation of the augers grain is guided towards the augers by the said surfaces and is then fed by the augers to the outlet aperture.

Preferably, the augers are disposed parallel to a pair of opposite side walls of the tank, the lower portions of these side walls being inclined to the vertical so as to provide inwardly and downwardly sloping surfaces serving to direct flow of grain to the augers.

Preferably, between and parallel with the augers are provided further sloping surfaces serving to direct flow of grain to the respective augers, the further surfaces being each downwardly and outwardly inclined towards a side wall of the tank.

The invention will now be described, by way of example, with reference to the accompanying diagrammatic drawings in which:

FIGURE 1 is an end elevation of a grain storage and supply means according to the invention; and FIGURE 2 is a side elevation, partly in section, of the grain storage and supply means of FIGURE 1, the drives to the moving parts of the storage and supply means having been omitted for the sake of clarity.

The grain storage and supply means illustrated in the drawings forms part of a combine harvester and is adapted to receive and store grain threshed by the threshing mechanism of the harvester until such time as it is convenient to discharge the grain into a lorry or trailer.

To this end the storage and supply means include a grain tank 1 which is mounted on an upper part of the harvester, intermediate the front and rear ground wheels, and is disposed so that its longitudinal axis extends across substantially the full width of the vehicle.

The grain tank is substantially rectangular when viewed in plan and is formed of upright inlet and outlet end walls 2 and 3, respectively, and two side walls 4 which have upper portions and downwardly and inwardly sloping lower portions 6.

For supplying grain to the tank 1, a grain elevator of the bucket and chain type, known per se, is provided within an elevator trunk 7 on one side of the harvester. This trunk extends upwardly and forwardly from the outlet end of the grain threshing mechanism to the tank and at its upper end carries a forwardly and downwardly sloping inlet spout 8 into which grain from the elevator is discharged. Communication between the spout 8 and the interior of the tank is effected by means of an auger tube 9 which extends horizontally from the lower end of the spout and through an aperture in the inlet end wall 2 of the trunk.

A shaft 11 extends from the lower part of the inlet spout 8, through the auger tube 9 and across the upper part of the tank in a direction parallel with the longitudinal axis of the tank. The ends of this shaft are supported in bearings respectively provided in a side wall of the spout and in the outlet end wall 3 of the tank.

A helical auger blade is provided on the portions of the shaft within the spout 8 and tube 9 and this blade continues across the major part of the tank, terminating a short distance away from the outlet end wall 3. The blade portion of the shaft forms an inlet auger 12 for the supply of grain to the tank.

For removing grain from the tank at the end of a threshing operation two discharge augers 13, each consisting of a shaft having a helical auger blade extending along substantially the whole of its length, are rotatably supported in bearings at the bottom of the tank 1. These augers are disposed parallel with one another and with the side walls 4 of the tank, and each extends from the inlet end of the tank to a location spaced from its outlet end.

Each of the discharge augers 13 is located close to the bottom of a downwardly sloping portion 6 of a side wall of the tank and the base of the tank between augers is formed of two further surfaces 14 which slope downwardly and outwardly towards respective side walls. Accordingly, each auger is disposed above a substantially V-shaped trough formed by the lower portion 6 of a side wall and one of these further sloping surfaces 14.

A longitudinally extending guide member 16 is mounted immediately above each discharge auger in order to direct the flow of grain to the sides of the auger.

An outlet aperture is formed in the bottom of the tank, between the ends of the discharge augers 13 and the outlet end 3 of the tank, and secured immediately below this aperture is a small grain receiving hopper 17. From the receiving hopper a discharge chute 17 extends upwardly to a height sufficient for a spout secured to its upper end to pass over the back of a lorry or trailer. Grain is carried from the grain receiving hopper 17 to the top of the discharge chute by an outlet auger 20 rotatably supported therein.

Drive for the augers mentioned above is taken off from a main countershaft 19 which is itself driven from the engine of the harvester. The main countershaft extends across substantially the full width of the machine and is immediately below the longitudinal axis of the grain tank, as seen in FIGURE 1. From the main countershaft 19 drive is initially transmitted by means of a belt and pulley drive 21 on one side of the harvester to an intermediate shaft 22, which drives a rear beater of the machine and is disposed above and slightly to the rear of the main countershaft, and thence by means of a chain drive 23 to a secondary countershaft 24. The latter is used for driving both the inlet auger shaft 11, and the two discharge augers 13.

In the case of the inlet auger, drive is transmitted from a pulley 26 secured to one end of the secondary countershaft 24 to a pulley 27 on the inlet auger shaft 11 by means of a belt 28 which engages both of these pulleys and also bears against a third, tensioning pulley 29.

In the case of the discharge augers 13 a further pulley 31, is provided on the same end of the secondary countershaft as pulley 26 and drives the forwardly disposed discharge auger by means of a belt 32 which engages a pulley 33 on the end of the auger shaft. The belt 32 also engages a tensioning pulley 34 which is movable into and out of engagement with the belt by means of a discharge lever 43 close to the driver's seat and connected to the pulley by a suitable linkage 37. Operation of the discharge lever 43 to move the tensioning pulley 34 out of engagement with the belt cuts off drive from the forward discharge auger in the manner of a clutch mechanism.

Drive is transmitted from the forward to the rearward of the discharge augers 13 by means of a chain 38, the chain being kept in tension by a rubbing block 39 of wood or metal which is secured to a side wall of the harvester and bears against the chain. The position of the block 39 can be adjusted manually to vary the tension.

The outlet auger 20 is driven by a further belt drive from the main countershaft 19, this drive being arranged on the opposite side of the machine from the drives mentioned above. Included in this drive is a further tensioning pulley 41 which is movable out of engagement with a belt 42 by means of an outlet lever 36 close to the driver's seat, to which it is connected by a further linkage 44.

The linkages 37 and 44 between the discharge and outlet levers 43 and 36, respectively, and the tensioning pulleys associated therewith are interconnected in such manner that the discharge lever 43 cannot be operated to cause rotation of the discharge augers 13 unless the outlet auger is also operating.

In operation of the combine harvester threshed grain from the threshing mechanism is carried upwardly in the buckets of the grain elevator and discharged into the spout 8 at its top. From the spout grain is moved horizontally into the tank by means of the inlet auger.

With the tank empty, grain supplied by the inlet auger 12 falls to the bottom and begins to pile up at the inlet end of the tank. Eventually sufficient grain will have been supplied for the top of the pile to be engaged by the helical blade on the inlet auger shaft, whereupon further grain supplied from the elevator tends to be urged by this blade along towards the outlet end of the tank. Threshing operations can continue until substantially the whole of the interior of the tank has been filled up to the level of the inlet auger including the portion beyond the discharge augers and above the outlet aperture.

When the tank has been filled discharge of grain on to a lorry is effected by operating the outlet lever 36 causing movement of the associated tensioning pulley 41 and operation of the outlet auger 20 in the manner described above. This serves to remove grain at the outlet end of the tank, above the receiving hopper 17. When this grain has been removed the discharge lever 36 is operated to cause rotation of the discharge augers 13 and these move grain in the lower part of the tank towards the outlet aperture and receiving hopper.

As grain is being removed by the augers 13 from the lower part of the tank grain in the upper parts flows downwardly under the influence of gravity and is guided by the lower portions 6 of the side walls of the tank and the downwardly sloping surfaces 14 between the discharge augers to the sides and bottoms of the discharge augers. Grain converged to the outlet end of the tank falls through the outlet aperture into the receiving hopper 17, from where it is conveyed up the discharge chute by the outlet auger.

It will be appreciated that by the provision of two discharge augers within the tank it is possible to increase the width, and hence the storage capacity of the tank for a given height of tank.

The interconnection between the linkages controlling the discharge and outlet augers is present to prevent operation of the discharge augers when the outlet auger is inoperative, thereby causing a build up of grain at the outlet end of the tank, leading to overloading and eventual seizing.

What I claim is:
1. In a combine harvester:
   (A) means defining a grain tank which serves as a temporary store for threshed grain and which has
      (1) opposite lengthwise extending side walls which have lower portions that slope inwardly and downwardly and which have their lower edges parallel and spaced apart by a substantial distance;
      (2) a pair of opposite end walls, in one of which there is an outlet opening, and
      (3) a bottom wall having a longitudinally extending raised medial portion that is laterally spaced from both side walls and cooperates with them to define a pair of longitudinally extending troughs,
   (B) a pair of discharge augers, one in each of said troughs, having their axes parallel and extending lengthwise in the tank for moving grain out of the tank through said outlet opening;
   (C) grain supply means, for feeding threshed grain into the tank, having an outlet near the top of the other of said end walls;
   (D) a distributing auger extending lengthwise through the tank intermediate the side walls with its axis substantially parallel to the axes of the discharge augers and spaced a substantial distance above the raised medial portion of the bottom wall;
   (E) a grain receiving hopper arranged to receive grain discharged through said outlet opening;
   (F) an outlet spout extending upwardly from the grain receiving hopper exteriorly of the tank and having a discharge outlet at its upper end;
   (G) an outlet auger within the outlet spout for conveying grain from the grain hopper to the discharge outlet in the spout;
   (H) transmission means connecting the discharge augers for rotation in unison;
   (I) a clutch mechanism for releasably coupling one of the discharge augers to a driving means on the harvester; and
   (J) a further clutch mechanism for releasably coupling the outlet auger to said driving means.

2. The combine harvester of claim 1, further characterized by: a longitudinally extending guide member above each discharge auger having opposite downwardly and laterally outwardly sloping surfaces which terminate above the bottom wall of the tank for directing grain to the sides of the discharge augers.

3. The combine harvester of claim 1 further characterized by: means coupling together the two clutch mechanisms so that operation of the first designated clutch mechanism to couple the grain discharge augers to the driving means is allowed by operation of the second designated clutch mechanism to couple the outlet auger to the driving means.

4. In a combine harvester:
(A) means providing an elongated grain tank which serves as a temporary store for threshed grain and which has
   (1) an outlet in one end,
   (2) a bottom that defines a pair of longitudinally extending side-by-side troughs,
   (3) and guide surfaces that direct grain into each of said troughs;
(B) a pair of discharge augers, one in each trough, for moving grain therealong to said outlet;
(C) grain supply means for feeding threshed grain into the tank, having an outlet that opens into the top of the tank at a location remote from said one end;
(D) a distributing auger extending lengthwise within the tank at a distance above the discharge augers;
(E) a grain receiving hopper arranged to receive grain discharged through said outlet;
(F) an outlet spout extending upwardly from the grain receiving hopper, externally of the tank;
(G) an outlet auger within the outlet spout for advancing grain therethrough;
(H) transmission means connecting the discharge augers for rotation in unison;
(I) a clutch mechanism for releasably coupling one of the discharge augers to a driving means on the harvester;
(J) and a further clutch mechanism for releasably coupling the outlet auger to said driving means.

References Cited by the Examiner

UNITED STATES PATENTS

| | | | |
|---|---|---|---|
| 2,507,873 | 5/1950 | Ward | 198—64 |
| 2,528,275 | 10/1950 | Heth | 214—83.32 |
| 2,585,169 | 2/1952 | Potter | 214—83.22 |
| 2,796,185 | 6/1957 | Bernstein | 214—519 |
| 3,045,804 | 7/1962 | Peterson | 198—64 |

SAMUEL F. COLEMAN, *Primary Examiner.*

ERNEST A. FALLER, *Examiner.*